US005300339A

United States Patent [19]

Hays et al.

[11] Patent Number: 5,300,339

[45] Date of Patent: Apr. 5, 1994

[54] DEVELOPMENT SYSTEM COATINGS

[75] Inventors: Dan A. Hays, Fairport; Joseph Mammino, Penfield; Damodar M. Pai, Fairport; Donald S. Sypula, Penfield; William H. Wayman, Ontario; John F. Yanus, Webster; Paul J. DeFeo, Sodus Point, all of N.Y.

[73] Assignee: Xerox Corporation, Stamford, Conn.

[21] Appl. No.: 37,700

[22] Filed: Mar. 29, 1993

[51] Int. Cl.$^5$ .............................................. B32B 1/08

[52] U.S. Cl. .................................... 428/36.9; 492/18; 492/53; 355/259; 430/120; 428/35.7; 428/327; 428/409; 428/412; 428/457; 428/906

[58] Field of Search ............... 428/323, 327, 412, 458, 428/35.7, 36.9, 409, 457, 906; 430/48, 58, 59, 902, 120; 355/259; 361/221, 225, 230; 492/18, 53

[56] References Cited

U.S. PATENT DOCUMENTS 3,924,943 12/1975 Fletcher ............................ 355/3 R
4,081,274 3/1978 Horgan .............................. 96/1 PC
4,265,990 5/1981 Stolka et al. .......................... 430/59
4,338,222 7/1982 Limburg et al. .................... 252/500
4,505,573 3/1985 Brewington et al. ........... 355/3 DD
4,540,645 9/1985 Honda et al. ....................... 430/122
4,565,437 1/1986 Lubinsky ......................... 355/3 DD
4,806,443 2/1989 Yanus et al. ......................... 430/56
4,809,034 2/1989 Marasaki et al. ............... 355/3 DD
4,868,600 9/1989 Hays et al. ......................... 355/259
4,988,595 1/1991 Pai et al. .............................. 430/59
5,110,669 5/1992 Knobel et al. ...................... 428/215
5,172,170 12/1992 Hays et al. ......................... 355/259

*Primary Examiner*—Patrick J. Ryan
*Assistant Examiner*—Marie R. Macholl
*Attorney, Agent, or Firm*—E. O. Palazzo

[57] ABSTRACT

A coated toner transport roll containing a core with a coating thereover of transporting molecules dispersed in a binder and an oxidizing agent selected from the group consisting of ferric chloride and trifluoroacetic acid. These oxidizing agents can be selected in an amount of from about 1 to about 50 weight percent. Also, the coating possesses a relaxation time of from about 0.0099 millisecond to about 3.5 milliseconds, and a residual voltage of from about 1 to about 10 volts.

9 Claims, 3 Drawing Sheets

DEVELOPMENT SYSTEM COATINGS

BACKGROUND OF THE INVENTION

This invention relates generally to overcoatings for ionographic or electrophotographic imaging and printing apparatuses or machines, and more particularly is directed to an effective overcoating for a donor member, such as a donor roll, preferably with electrodes closely spaced therein to form a toner cloud in the development zone to develop a latent image. The present invention in embodiments is also directed to suitable charge relaxable overcoatings, especially for the toner transport means in, for example, scavengeless or hybrid scavengeless development systems, reference for example U.S. Pat. No. 4,868,600, U.S. Pat. No. 5,172,170, and copending patent applications U.S. Ser. No. 396,153 (now abandoned) and U.S. Ser. No. 724,242, the disclosures of which are totally incorporated herein by reference.

Overcoatings for donor rolls are known which contain a dispersion of conductive particles like carbon black or graphite in a dielectric binder, such as a phenolic resin or fluoropolymer, as disclosed in U.S. Pat. No. 4,505,573 to Brewington et al. The desired resistivity is achieved by controlling the loading of the conductive material. However, very small changes in the loading of conductive materials near the percolation threshold cause dramatic changes in resistivity. Furthermore, changes in the particle size and shape can cause wide variations in the resistivity at constant weight loading. The desired volume electrical resistivity of the overcoating layer is in the range of from about $10^7$ ohm-cm to about $10^{13}$ ohm-cm. Preferably, the electrical resistivity is in the range of $10^9$ ohm-cm to about $10^{11}$ ohm-cm. If the resistivity is too low, electrical breakdown of the coating can occur when a voltage is applied to an electrode or material in contact with the overcoating, and resistive heating can cause the formation of holes in the coating. When the resistivity is too high ($\sim 10^{13}$ ohm-cm), charge accumulation on the surface of the overcoating creates a voltage which changes the electrostatic forces acting on the toner. The dielectric constant of the overcoatings used in the present invention ranges in embodiments from about 3 to about 5, and is preferably about 3. The problem of the sensitivity of the resistivity to the loading of conductive materials in an insulative dielectric binder Is avoided, or minimized with the coatings of the present invention.

Generally, the process of electrophotographic printing includes charging a photoconductive member to a substantially uniform potential so as to sensitize the surface thereof. The charged portion of the photoconductive surface is exposed to a light image of an original document being reproduced. This records an electrostatic latent image on the photoconductive surface. After the electrostatic latent image is recorded on the photoconductive surface, the latent Image is developed with a developer material. Two component and single component developer materials are commonly used. A typical two component developer material comprises magnetic carrier granules having toner particles adhering triboelectrically thereto. A single component developer material typically comprises toner particles. Toner particles are attracted to the latent image forming a toner powder image on the photoconductive surface. The toner powder image is subsequently transferred to a copy sheet. Finally, the toner powder image is heated to permanently fuse it to the copy sheet in image configuration.

Trilevel, highlight color xerography is described in U.S. Pat. No. 4,078,929 (Gundlach). This patent discloses trilevel xerography as a means to achieve single-pass highlight color imaging wherein a charge pattern is developed with toner particles of a first and second colors. The toner particles of one of the colors are positively charged and the toner particles of the second color are negatively charged. In one embodiment, the toner particles are presented to the charge pattern by a pair of magnetic brush development systems wherein each system supplies a toner of one color and one charge.

In highlight color xerography, the xerographic contrast on the charge retentive surface or photoreceptor is divided into three levels, rather than two levels as is the situation for conventional xerography. The photoreceptor is charged, typically to $-900$ volts, and is exposed imagewise, such that one image corresponding to charged image areas (which are subsequently developed by charged-area development, CAD) remains at the full photoreceptor potential ($V_{cad}$ or $V_{ddp}$). The other image is exposed to discharge the photoreceptor to its residual potential, for example $V_{dad}$ or $V_c$ (typically $-100$ volts) which corresponds to discharged area images that are subsequently developed by discharged area development (DAD) and the background areas exposed such as to reduce the photoreceptor potential to halfway between the $V_{cad}$ and $V_{dad}$ potentials, (typically $-500$ volts) and is referred to as $V_{white}$ or $V_w$. The CAD developer is typically biased about 100 volts closer than $V_{cad}$ than $V_{white}$ (about $-600$ volts), and the DAD developer system is biased about 100 volts closer to $V_{dad}$ than $V_{white}$ (about $-400$ volts).

The viability of printing system concepts such as trilevel and highlight color xerography usually requires development systems that do not scavenge or interact with a previously toned image. Since several known development systems such as conventional magnetic brush development and jumping single component development, interact with the image receiver, a previously toned image will be scavenged by subsequent development, and as these development systems are highly interactive with the image bearing member, there is a need for scavengeless or non-interactive development systems.

Single component development systems can use a donor roll for transporting charged toner to the development nip defined by the donor roll and photoconductive member. The toner is developed on the latent image recorded on the photoconductive member by a combination of mechanical and/or electrical forces. Scavengeless development and jumping development are two types of single component development. In one version of a scavengeless development system, a plurality of electrode wires are closely spaced from the toned donor roll in the development zone. An AC voltage is applied to the wires to generate a toner cloud in the development zone. The electrostatic fields associated with the latent image attract toner from the toner cloud to develop the latent image. In another version of scavengeless development, isolated electrodes are provided within the surface of a donor roll. The application of an AC bias to the electrodes in the development zone causes the generation of a toner cloud. In jumping development, an AC voltage is applied to the donor roll for detaching toner from the donor roll and projecting the toner toward the photoconductive member so that the electrostatic fields associated with the latent image attract the toner to develop the latent image. Single component development systems appear to offer advantages in low cost and design simplicity. However, the achievement of high reliability and easy manufacturability of the system can present a problem. Two component development systems have been used extensively in many different types of printing machines. A two component development system usually employs a magnetic brush developer roller for transporting carrier having toner adhering triboelectrically thereto. The electrostatic fields associated with the latent image attract the toner from the carrier so as to develop the latent Image. In high speed commercial printing machines, a two component development system may have lower operating costs than a single component development system. Accordingly, it is considered desirable to combine these systems to form a hybrid development system having the desirable features of each system. For example, at the 2nd International Congress on Advances in Non-impact Printing held in Washington, D.C. on Nov. 4 to 8, 1984, sponsored by the Society for Photographic Scientists and Engineers, Toshiba described a development system using a donor roll and a magnetic roller. The donor roll and magnetic roller were electrically biased, and the magnetic roller transported a two component developer material to the nip defined by the donor roll and magnetic roll. Toner is attracted to the donor roll from the magnetic roll, and the donor roll is rotated synchronously with the photoconductive drum with the gap therebetween being about 0.20 millimeter. The large difference in potential between the donor roll and latent image recorded on the photoconductive drum causes the toner to jump across the gap from the donor roll to the latent image so as to develop the latent image. Various other similar types of development systems have been devised.

The following prior art is also mentioned:

U.S. Pat. No. 3,929,098; Petentee: Liebman; Issued: Dec. 30, 1975

U.S. Pat. No. 4,540,645; Petentee: Honda et al.; Issued: Sep. 10, 1985

U.S. Pat. No. 4,565,437; Petentee: Lubinsky; Issued: Jan. 21, 1986

U.S. Pat. No. 4,809,034; Petentee: Murasaki et al.; Issued: February 28, 1989

U.S. Pat. No. 4,868,600 Petentee: Hays et al.; Issued: Sep. 19, 1989

U.S. Pat. No. 5,144,371 Petentee: Hays; Issued: Sep. 1, 1992

U.S. Pat. No. 3,929,098 describes a developer sump located below a donor roll. A developer mix of toner particles and ferromagnetic carrier granules Is in the sump. A cylinder having a magnet disposed therein rotates through the developer mix and conveys the developer mix adjacent the donor roll. An electrical field between the cylinder and donor roll loads the donor roll with toner particles.

U.S. Pat. No. 4,540,645 discloses a development apparatus using a magnetic roll contained within a nonmagnetic sleeve. A two component developer is supplied on the outer peripheral surface of the sleeve from a developer tank to form a magnetic brush. The developer material is brought into sliding contact with the photosensitive layer to develop the latent image with toner.

U.S. Pat. No. 4,565,437 describes a development system in which a photoconductive belt is wrapped about a portion of a first developer roller and spaced from a second developer roller. Each developer roller uses a magnet disposed interiorly of a nonmagnetic sleeve. The sleeves rotate to advance two component developer material into contact with the photoconductive belt to develop the latent image recorded thereon.

U.S. Pat. No. 4,809,034 discloses a developing device having a nonmagnetic developing sleeve. A magnetic roller is incorporated in the developing sleeve. A toner supply roller transports toner to the developing sleeve from the toner reservoir. The electrical potential on the supply roller is lower than that on the surface of the developing sleeve so that toner is attracted to the developing sleeve forming a brush of toner thereon. The developing sleeve conveys the brush of toner into contact with the photoconductive drum to develop the latent image recorded thereon.

U.S. Pat. No. 4,868,600 describes a scavengeless development system in which a donor roll has toner deposited thereon. Electrode wires are closely spaced to the donor roll in the gap between the donor roll and the photoconductive member. An AC voltage is applied to the electrode wires to detach toner from the donor roll and form a toner powder cloud in the gap. Toner from the toner powder cloud is attracted to the latent image recorded on the photoconductive member to develop the latent image recorded thereon. A conventional magnetic brush with conductive two component developer can be used for depositing the toner layer onto the donor roll. To prevent shorting between the conductive core of the donor roll and the AC biased wires or conductive magnetic brush, a resistive overcoating is usually selected.

U.S. Pat. No. 4,338,222 describes conducting compositions comprising an organic hole transporting compound, and the reaction product of an organic hole transporting compound and an oxidizing agent capable of accepting one electron from the hole transporting compound.

In accordance with one aspect of the present invention, there is provided an apparatus for developing a latent image recorded on a surface. The apparatus includes a housing defining a chamber storing a supply of developer material comprising at least carrier and toner. In embodiments, there is provided a donor member with an improved coating thereover comprised of, for example, a charge transporting aryl diamine type monomer, reference U.S. Pat. No. 4,265,990, the disclosure of which is totally incorporated herein by reference, dispersed in a resin binder like a polycarbonate, such as LEXAN TM, MAKROLON TM, or MERLON TM, and wherein an oxidant's molecularly dispersed in the aforementioned composition, and which roll is spaced from the surface and adapted to transport toner to a region opposed from the surface. In a hybrid scavengeless system, developer material containing toner, for example of resin particles such as styrene acrylates, styrene methacrylates, styrene butadienes and pigment particles, such as carbon black, contained in a housing, is used to apply and maintain a toner layer on the donor roll. The developer roll and the donor member cooperate with one another to define a region wherein a substantially constant amount of toner having a substantially constant triboelectric charge's deposited on the donor member. The donor roll can contain isolated electrodes within the surface which are overcoated with the aforementioned coating. The isolated electrodes are electrically biased to detach toner from the donor member so as to form a toner cloud in the space between the donor roll and latent image member, which detached toner forms a toner cloud that develops the latent image.

Pursuant to another embodiment of the present invention, there is provided an electrophotographic printing machine of the type in which an electrostatic latent image recorded on a photoconductive member is developed to form a visible image thereof. The improvement includes a housing defining a chamber storing a supply of developer material comprising at least carrier and toner. A certain coated donor member is spaced from the photoconductive member and adapted to transport toner to a region opposed from the photoconductive member. Developer material containing toner is used to apply and maintain a toner layer on the donor roll. The developer roll and the donor member cooperate with one another to define a region wherein a substantially constant amount of toner having a substantially constant triboelectric charge is deposited on the donor member. The donor roll contains isolated electrodes within the surface which are overcoated with the coating. The isolated electrodes are electrically biased to detach toner from the donor member so as to form a toner cloud in the space between the donor roll and latent image member, and which detached toner forms a cloud that develops the latent image.

In embodiments of the present invention, there are provided overcoating components for electrophotographic development donor rolls wherein an oxidant, such as $FeCl_3$ or hydrated $FeCl_3.6H_2O$, is molecularly dispersed in a hole transporting matrix of an aryl diamine, such as N,N'-diphenyl-N,N'-bis(3-methylphenyi)-[1,1'-biphenyl]-4,4'-diamine, which diamine is dispersed in a resin binder like a polycarbonate such as MAKROLON®, or a polyethercarbonate (PEC), reference U.S. Pat. No. 4,806,443, the disclosure of which is totally incorporated herein by reference, to enable, for example, conductivity control, and provide for the desired charge relaxation time constant for said rolls.

In copending application U.S. Ser. No. 937,836, the disclosure of which is totally incorporated herein by reference, there is illustrated a coated transport roll comprised of a core with a coating comprised of a charge transporting polymer and an oxidizing agent.

SUMMARY OF THE INVENTION

It is an object of the present invention to provide improved coatings with many of the advantages illustrated herein.

Another object of the present invention is to provide donor roll coatings with many of the advantages illustrated herein.

Also, another object of the present Invention is to provide improved donor roll coatings, which coatings enable improved conductivity uniformity and control in achieving a desired charge relaxation time constant with a molecular dispersion of a conductivity inducing component in the aforementioned overcoatings.

Another object of the present invention is to protect wear resistant electrodes on the donor roll.

Yet another object of the present invention is to prevent electrical shorting with conductive carrier beads.

Moreover, another object of the present Invention relates to the provision of improved overcoatings for electrophotographic development subsystem donor means, such as rolls, by the molecular dispersion of an oxidant like $FeCl_3$ in a charge transporting monomer or molecules, for example aryl diamines, dispersed in a resin binder, such as a polyethercarbonate (PEC), which composition enables, for example, improved and stable uniformity of the conductivity throughout the coating, and latitude and control in selecting a desired charge relaxation time constant. Further, in another object of the present invention there are provided overcoated donor rolls with an oxidant like $FeCl_3$, molecular dispersed in a hole transporting matrix of a polyethercarbonate (PEC) to enable improved conductivity uniformity and control in achieving a desired charge relaxation time constant.

Also, another object of the present invention is to provide improved donor roll coatings, which coatings enable improved conductivity uniformity and control in achieving a desired charge relaxation time constant by varying the concentration of the charge transporting molecule.

Further, another object of the present invention is the provision of coatings comprised of partially oxidized N,N'-diphenyl-N,N'-bis(3-methylphenyl)-(1,1'-biphenyl)-4,4'-diamine or variants thereof dispersed in a suitable binder such as bisphenol A polycarbonate.

These and other objects of the present invention are accomplished in embodiments by the provision of certain coatings for various imaging systems. More specifically, in embodiments there are provided in accordance with the present invention certain overcoatings for toner transport means, such as transport rolls selected for the scavengeless and hybrid scavengeless systems mentioned herein. These overcoatings contain a partially oxidized charge transporting molecule or monomer dispersed in a binder and therefore have at least three constituents; a charge transporting monomer, a binder polymer and an oxidizing agent. Any suitable charge transporting monomer may be utilized in the coatings of this invention. These electrically active charge transporting monomer materials should be capable of being oxidized by the oxidizing agent and be able to support the motion of holes through the unoxidized monomers in the composition. The charge transporting monomers in the film composition can be an oxadiazole, hydrazone, carbazole, triphenylamine, diamine, and the like.

Examples of charge transporting aryl amine compounds are represented by the formula:

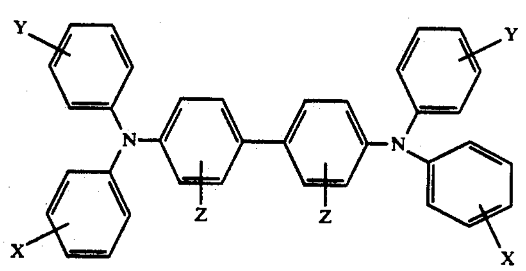

wherein X, Y and Z are selected from the group consisting of hydrogen, an alkyl group with, for example, from 1 to about 25 carbon atoms, such as methyl, ethyl, propyl, butyl, pentyl, hexyl, heptyl, nonyl, and the like; and a halogen preferably chlorine, and at least one of X, Y and Z is independently an alkyl group or chlorine. When Y and Z are hydrogen, the compound may be named N,N'-diphenyl-N,N'-bis(alkylphenyl)-[1,1'-biphenyl]-4,4'-diamine wherein the alkyl is, for example, methyl, ethyl, propyl, n-butyl, or the like, or the compound may be N,N'-diphenyl-N,N'-bis(chlorophenyl)-[1,1'-biphenyl]-4,4'-diamine.

Examples of other hole transport compounds that may be selected are those of the type described in U.S. Pat. Nos. 4,306,008; 4,304,829; 4,233,384; 4,115,116; 4,299,897; 4,081,274 and 5,139,910, the disclosures of each of which are totally incorporated herein by reference. Typical diamine hole transport molecules include N,N'-diphenyl-N,N'-bis(3-methylphenyl)-(1,1'-biphenyl)-4,4'-diamine, N,N'-diphenyl-N,N'-bis(4-methylphenyl)-(1,1'-biphenyl)-4,4'-diamine, N,N'-diphenyl-N,N'-bis(2-methylphenyl)-(1,1'-biphenyl)-4,4'-diamine, N,N'-diphenyl-N,N'-bis(3-ethylphenyl)-(1,1'-biphenyl)-4,4'-diamine, N,N'-diphenyl-N,N'-bis(4-ethylphenyl)-(1,1'-biphenyl)-4,4'-diamine, N,N'-diphenyl-N,N'-bis(4-n-butylphenyl)-(1,1'-biphenyl)-4,4'-diamine, N,N'-diphenyl-N,N'-bis(3-chlorophenyl)-[1,1'-biphenyl]-4,4'-diamine, N,N'-diphenyl-N,N'-bis(4-chlorophenyl)-[1,1'-biphenyl]-4,4'-diamine, N,N'-diphenyl-N,N'-bis(phenylmethyl)-[1,1'-biphenyl]-4,4'-diamine, N,N,N',N'-tetraphenyl-[2,2'-dimethyl-1,1'-biphenyl]-4,4'-diamine, N,N,N',N'-tetra-(4-methylphenyl)-[2,2'-dimethyl-1,1'-biphenyl]-4,4'-diamine, N,N'-diphenyl-N,N'-bis(4-methylphenyl)-[2,2'-dimethyl-1,1'-biphenyl]-4,4'-diamine, N,N'-diphenyl-N,N'-bis(2-methylphenyl)-[2,2'-dimethyl-1,1'-biphenyl]-4,4'-diamine, N,N'-diphenyl-N,N'-bis(3-methylphenyl)-[2,2'-dimethyl-1,1'-biphenyl]-4,4'-diamine, N,N'-diphenyl-N,N'-bis(3-methylphenyl)-pyrenyl-1,6-diamine, and the like.

The oxidizing agent or agents for the coating may be selected from a variety of materials, such as salts, comprised of an anion selected from the group consisting of $SbCl_6^-$; $SbCl_4^-$ and $PF_6^-$ and a cation selected from the group consisting of a triphenyl methyl+; tetraethylammonium+; benzyl dimethylphenyl ammonium+; 2,4,6-trimethyl pyridylium+; Ag+; K+; Na+; NO+ such as tris(4-bromophenyl)ammonium hexachloroanthimonate (TBTPAT). other oxidizing agents include ferric chloride, both hydrated and anhydrous; acids such as trifluoroacetic acid (TFA), and the like. Other oxidizing agents are 2,4,6-trinitrobenzene sulfonic acid; dichloromaleic anhydride; tetrabromophthalic anhydride; 2,7-dinitro-9-fluorenone; 2,4,7-trinitro-9-fluorenone; tetraphenyl phthalic anhydride; $SeO_2$, $N_2O_4$ and similar oxidizing agents which accept one electron from the hole transporting monomer. More than one antioxidant, that is a mixture thereof, can be employed in various effective ratios, such as 1:9 to 9:1.

One process for the coating preparation involves adding the resin binder in a suitable so vent and stirring with a magnetic stirrer until a complete solution is achieved- The charge transporting monomer is subsequently added and the mixture stirred until a complete solution is achieved. The oxidant is then added and the stirring continued to assure a uniform distribution thereof. Films are then coated from the formed solution of the binder, charge transporting monomer and the oxidant in a solvent, and which coating can be accomplished by bar, spray or dip processes. The solvents can be, for example, organic solvents like methylene chloride, chlorobenzene, toluene, tetrahydrafuran or mixtures thereof. The concentration of the oxidant can range from about 1 percent by weight up to about 50 percent by weight of the charge transporting monomer, and preferably from about 2 weight percent to about 15 weight percent with the exact concentration depending on the relaxation time desired. The film thickness ranges from 5 microns to 50 micrometers depending on the application.

Inasmuch as the art of electrophotographic printing is well known, the various processing stations employed in the FIG. 1 imaging or printing machine or apparatus will be shown hereinafter schematically and their operation described briefly with reference thereto.

Figure 1:
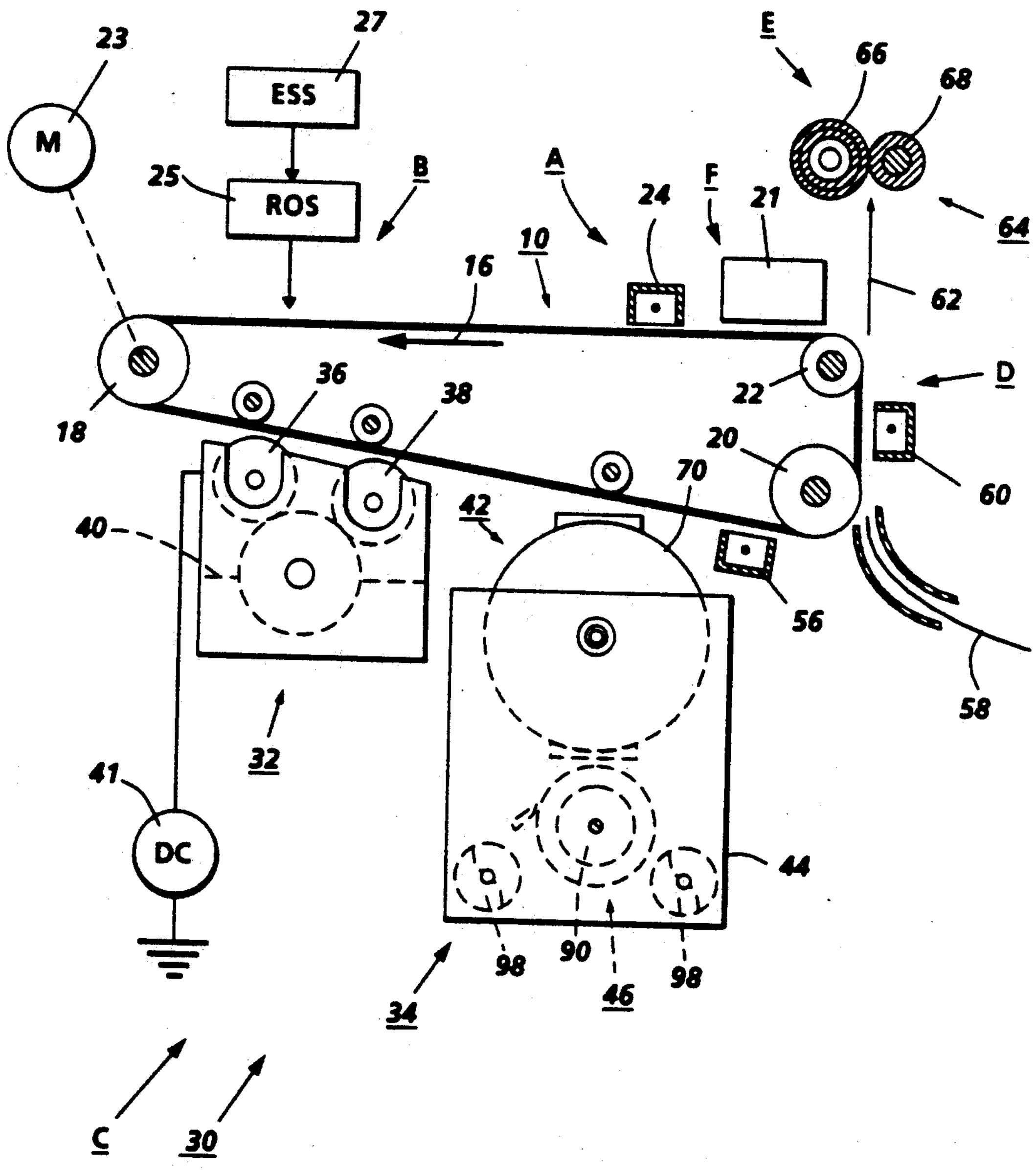
FIG. 1 is a schematic elevational view of an illustrative electrophotographic printing machine incorporating a development apparatus having the features of the present invention therein.

Referring initially to FIG. 1, there is shown an illustrative electrophotographic printing machine incorporating the development apparatus of the present invention therein. The electrophotographic printing machine employs a photoconductive belt 10 comprised of a photoconductive surface and an electrically conductive substrate and mounted for movement past a charging station A, an exposure station B, developer station C, transfer station D and cleaning station F. Belt 10 moves in the direction of arrow 16 to advance successive portions thereof sequentially through the various processing stations disposed about the path of movement thereof. Belt 10 is entrained about a plurality of rollers 18, 20 and 22, the former of which can be used as a drive roller and the latter of which can be used to provide suitable tensioning of the photoreceptor belt 10. Motor 23 rotates roller 18 to advance belt 10 in the direction of arrow 16, and roller 18 is coupled to motor 23 by suitable means such as a belt drive.

With further reference to FIG. 1, initially successive portions of belt 10 pass through charging station A, whereat a corona discharge device such as a scorotron, corotron or dicorotron indicated generally by the reference numeral 24, charges the belt 10 to a selectively high uniform positive or negative potential, $V_0$. Any suitable known control may be employed for controlling the corona discharge device 24.

The charged portions of the photoreceptor surface are advanced through exposure station B. At exposure station B, the uniformly charged photoreceptor or charge retentive surface 10 is exposed to a laser based output scanning device 25 which causes the charge retentive surface to be discharged in accordance with the output from the scanning device. Preferably, the scanning device is a three level laser Raster Output Scanner (ROS). Alternatively, the ROS could be replaced by a conventional xerographic exposure device. An electronic subsystem (ESS) 27 provides for control of the ROS as well as other subassemblies of the device or apparatus.

The photoreceptor, which is initially charged to a voltage $V_0$, undergoes dark decay to a level $V_{ddp}$ equal to about −900 volts. When exposed at the exposure station B it is discharged to $V_C$ equal to about −100 volts which is near zero or ground potential in the highlight, that is color other than black, color parts of the image. The photoreceptor is also discharged to $V_W$ equal to approximately −500 volts imagewise in the background (white) image areas.

At development station C, a development system, indicated generally by the reference numeral 30 advances developer materials into contact with the electrostatic latent images. The development system 30 comprises first and second developer apparatuses 32 and 34. The developer apparatus comprises a housing containing a pair of magnetic brush rollers 36 and 38. The rollers advance developer material 40 into contact with the latent images on the charge retentive surface which are at the voltage level $V_C$. The developer material 40 contains color toner and magnetic carrier beads. Appropriate electrical biasing of the developer housing is accomplished by power supply 41 electrically connected to developer apparatus 32. A DC bias of approximately −400 volts is applied to the rollers 36 and 38 via the power supply 41. With the foregoing bias voltage applied and the color toner suitably charged, discharged area development (DAD) with colored toner is effected.

The second developer apparatus 34 comprises a donor structure in the form of a roller 42. Preferably, development system 34 includes donor roller 42 with an overcoating 70 as illustrated herein, and electrodes embedded in the dielectric core. Electrodes 94 are electrically biased with an AC voltage relative to adjacent interdigitated electrodes 92 for the purpose of detaching toner therefrom so as to form a toner powder cloud in the gap between the donor roll and photoconductive surface. Both electrodes 92 and 94 are biased at a DC potential of −600 volts for charged area development (CAD) with a second colored toner. The latent image attracts toner particles from the toner powder cloud forming a toner powder image thereon. Donor roll 42 is mounted, at least partially, in the chamber of developer housing 44. The chamber in developer housing 44 stores a supply of developer (toner and carrier) material. The developer material is preferably a conductive two component developer comprised of at least carrier granules having toner particles adhering triboelectrically thereto. A magnetic roller 46 disposed interiorly of the chamber of housing 44 conveys the developer material to the donor roll. The magnetic roller is electrically biased relative to the donor roll so that the toner particles are attracted from the magnetic roller to the donor roll. Components such as 46, 90 and 98 are illustrated with reference to FIG. 2. The development apparatus is illustrated in greater detail with reference to FIG. 2.

A sheet of support material 58, such as paper, is moved into contact with the toner Image at transfer station D. The sheet of support material is advanced to transfer station D by conventional sheet feeding apparatus, not shown. Preferably, the sheet feeding apparatus includes a feed roll contacting the uppermost sheet of a stack of copy sheets. Feed rolls rotate so as to advance the uppermost sheet from the stack into a chute which directs the advancing sheet of support material into contact with the photoconductive surface of belt 10 in a timed sequence so that the toner powder image developed thereon contacts the advancing sheet of support material at transfer station D.

Since the composite image developed on the photoreceptor consists of both positive and negative toner, a positive pretransfer corona discharge member 56 is provided to condition the toner for effective transfer to the substrate using negative corona discharge.

Transfer station D includes a corona generating device 60 which sprays ions of a suitable polarity onto the backside of sheet 58. This attracts the charged toner powder images from the belt 10 to sheet 58. After transfer, the sheet continues to move, in the direction of arrow 62, onto a conveyor (not shown) which advances the sheet to fusing station E.

Fusing station E includes a fuser assembly, indicated generally by the reference numeral 64, which permanently affixes the transferred powder image to sheet 58. Preferably, fuser assembly 64 comprises a heated fuser roller 66 and a backup roller 68. Sheet 58 passes between fuser roller 66 and backup roller 68 with the toner powder image contacting fuser roller 66. In this manner, the toner powder image is permanently affixed to sheet 58. After fusing, a chute, not shown, guides the advancing sheet 58 to a catch tray, also not shown, for subsequent removal from the imaging or printing apparatus.

After the sheet of support material is separated from photoconductive surface of belt 10, the residual toner particles carried by the nonimage areas on the photoconductive surface are removed therefrom. These particles are removed at cleaning station F. A magnetic brush cleaner housing 21 is disposed at the cleaning station F. The cleaning apparatus comprises a conventional magnetic brush roll structure for causing carrier particles in the cleaner housing to form a brush-like orientation relative to the roll structure and the charge retentive surface. It also includes a pair of detoning rolls for removing the residual toner from the brush.

Subsequent to cleaning, a discharge lamp (not shown) floods the photoconductive surface with light to dissipate any residual electrostatic charge remaining prior to the charging thereof for the next imaging cycle.

Figure 2:
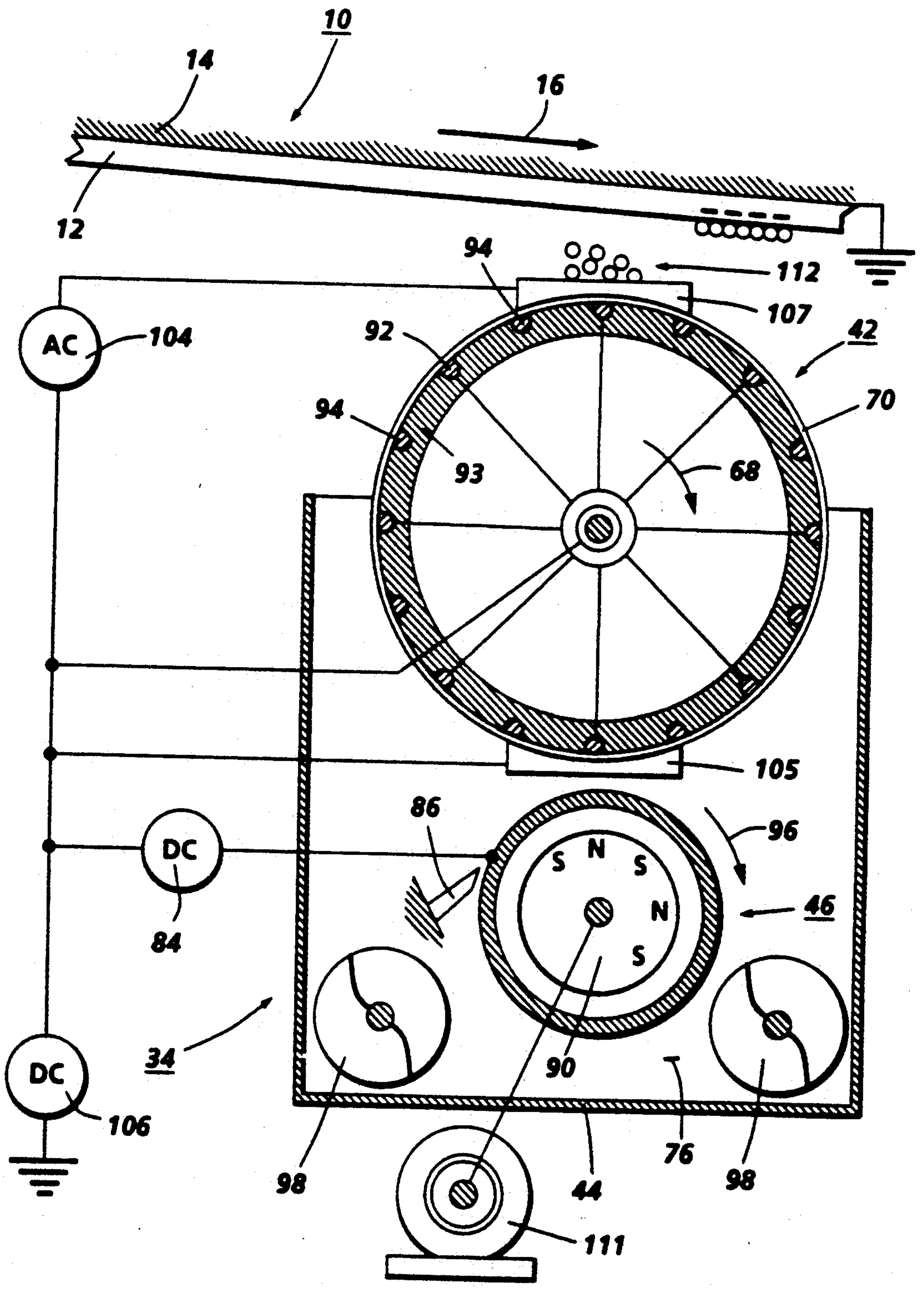
FIG. 2 is a schematic elevational view showing the development apparatus used in the FIG. 1 printing machine.

Referring now to FIG. 2, there is shown development system 34 in greater detail with AC and DC power sources. Development system 34 includes a housing 44 defining a chamber 76 for storing a supply of developer material therein. Coated donor roll 42 comprises first and second sets of electrodes 92 and 94. The active interdigitated electrodes 94 and passive interdigitated electrodes 92 and magnetic roller 46 are mounted in chamber 76 of housing 44. The donor roll can be rotated in either the "with" or "against" direction relative to the direction of motion of belt 10. In FIG. 2, donor roll 42 is shown rotating in the direction of arrow 68, the "with" direction. Similarly, the magnetic roller can be rotated in either the "with" or "against" direction relative to the direction of motion of the donor roll 42. In FIG. 2, magnetic roller 46 is shown rotating in the direction of arrow 96, the "against" direction. The core 93 of the donor roll is preferably comprised of a dielectric base, such as a polymeric material like a vinyl ester.

The two sets of electrodes 92 and 94 are arranged in an interdigitated fashion as shown. The electrodes are overcoated with a charge relaxable polymeric coating 70 having a thickness of approximately 25 pm and forming the outer surface of the donor structure 42. Thus, the electrodes are positioned in close proximity to the toner layer on the donor surface. The gap between the donor structure 42 and the photoconductive surface 10 is approximately 250 pm. In this example, the electrodes are 100 μm wide with a center-to-center spacing of 250 μm.

An AC power source 104 applies an electrical bias of, for example, 1,200 volts peak at 4 kHz to the one set of electrodes 94. A DC bias from 0 to 1,000 volts is applied by a DC power source 106 to all of the electrodes of both sets of electrodes 92 and 94. The AC voltage applied to the one set of electrodes establishes AC fringe fields serving to liberate toner particles from the surface of the donor structure 42 to form the toner cloud 112. The AC voltage is referenced to the DC bias applied to the electrodes so that the time average of the AC bias is equal to the DC bias applied. Thus, the equal DC bias on adjacent electrodes precludes the creation of DC electrostatic fields between adjacent electrodes which would impede toner liberation by the AC fields.

When the AC fringe field is applied to a toner layer via an electrode structure in close proximity to the toner layer, the time-dependent electrostatic force acting on the charged toner momentarily breaks the adhesive bond to cause toner detachment and the formation of a powder cloud or aerosol 1 1 2. The DC electric field from the electrostatic image controls the deposition of toner on the image receiver.

Number 111 is a motor used to supply power to 46 primarily. The two sets of electrodes 92 and 94 are supported on a dielectric cylinder In a circular orientation. Each of the electrodes 94 are electrically isolated on the donor roll whereas all of the electrodes 92 are connected. The AC voltage 104 applied to the active electrodes 94 is commutated via a conductive brush 107 at one end of the roll and contacting only those electrically isolated electrodes 94 positioned in the nip between the photoconductive surface and the donor roll. If the toned donor is subjected to the AC fringe field before the development zone, the development efficiency would be degraded. This observation implies that an AC field is applied only in the development nip. Limiting the AC field region to a fraction of the nip width will also help to reduce toner emissions that are usually associated with other nonmagnetic development systems.

The toner metering and charging are provided by a conductive two component developer system in a magnetic brush development system. To control the electrical bias on the electrically isolated electrodes 94 when positioned in the toner metering and charging nip, a second conductive brush 105 may be provided with a bias from the DC power supply 106, as illustrated in FIG. 2.

For magnetic brush loading of the donor roll with a two component developer, there can be selected scavengeless hybrid, as illustrated in copending patent application U.S. Ser. No. 396,153, now abandoned, U.S. Pat. No. 5,032,872 and U.S. Pat. No. 5,034,775, the disclosures of which are totally incorporated herein by reference. Also, U.S. Pat. No. 4,809,034 describes two-component loading of donor rolls and. U.S. Pat. No. 4,876,575 discloses another combination metering and charging device suitable for use in the present invention.

Toner can also be deposited on the donor roll 42 via other toner metering and charging devices. A combination metering and charging device may comprise any suitable device for depositing a monolayer of well charged toner onto the donor structure 42. For example, it may comprise an apparatus such as described in U.S. Pat. No. 4,459,009 wherein the contact between weakly charged particles and a triboelectrically active coating contained on a charging roller results in well charged toner.

As illustrated in FIG. 2, an alternating electrical bias is applied to the active interdigitated electrodes 92 and 94 by an AC voltage source 104. The applied AC establishes an alternating electric field between the interdigitated electrodes 92 and 94 which is effective in detaching toner from the surface of the donor roller and forming a toner cloud 112, the height of the cloud being such as not to be substantially in contact with the belt 10 moving in direction 16, with image area 14. The magnitude of the AC voltage is in the order of 800 to 1,200 volts peak at a frequency ranging from about 1 kHz to about 6 kHz. A DC bias supply 106, which applies approximately 300 volts to donor roll 42, establishes an electrostatic field between photoconductive surface 12 of belt 10 and donor roll 42 for attracting the detached toner particles from the cloud to the latent image recorded on the photoconductive surface. An applied voltage of 800 to 1,200 volts produces a relatively large electrostatic field without risk of air breakdown. The use of a dielectric overcoating 70 on the donor roll helps to prevent shorting between the interdigitated electrodes. Magnetic roller 46 meters a constant quantity of toner having a substantially constant charge onto donor roll 42. This insures that the donor roll is loaded with a constant amount of toner having a substantially constant charge in the development gap. The combination of donor roll spacing, that is spacing between the donor roll and the magnetic roller, the compressed pile height of the developer material on the magnetic roller, and the magnetic properties of the magnetic roller in conjunction with the use of a conductive, magnetic developer material, achieves the deposition of a constant quantity of toner having a substantially constant charge on the donor roller. A DC bias supply 84 which applies approximately 100 volts to magnetic roller 46 establishes an electrostatic field between magnetic roller 46 and the coated donor roll 42 so that an electrostatic field is established between the donor roll and the magnetic roller which causes toner particles to be attracted from the magnetic roller to the donor roll. Metering blade 86 is positioned closely adjacent to magnetic roller 46 to maintain the compressed pile height of the developer material on magnetic roller 46 at the desired level. Magnetic roller 46 includes a nonmagnetic tubular member made preferably from aluminum and having the exterior circumferential surface thereof roughened. An elongated magnet 90 Is positioned interiorly of and spaced from the tubular member. The magnet is mounted stationary. The tubular member rotates in the direction of arrow 96 to advance the developer material adhering thereto into the nip defined by donor roll 42 and magnetic roller 46. Toner particles are attracted from the carrier granules on the magnetic roller to the donor roll.

With continued reference to FIGS. 1, and especially FIG. 2, augers, indicated generally by the reference numeral 98, are located in chamber 76 of housing 44. Augers 98 are mounted rotatably in chamber 76 to mix and transport developer material. The augers have blades extending spirally outwardly from a shaft. The blades are designed to advance the developer material in the axial direction substantially parallel to the longitudinal axis of the shaft. Toner metering roll is designated 90.

As successive electrostatic latent images are developed, the toner particles within the developer material are depleted. A toner dispenser (not shown) stores a supply of toner particles. The toner dispenser is in communication with chamber 76 of housing 44. As the concentration of toner particles in the developer material is decreased, fresh toner particles are furnished to the developer material in the chamber from the toner dispenser. The augers in the chamber of the housing mix the fresh toner particles with the remaining developer material so that the resultant developer material therein is substantially uniform with the concentration of toner particles being optimized. In this manner, a substantially constant amount of toner particles are in the chamber of the developer housing with the toner particles having a constant charge. The developer material in the chamber of the developer housing is magnetic and may be electrically conductive. By way of example, the carrier granules include a ferromagnetic core having a thin layer of magnetite overcoated with a noncontinuous layer of resinous material. The toner particles are prepared from a resinous material, such as a vinyl polymer, mixed with a coloring material, such as carbon, or chromogen black. The developer material comprises from about 95 percent to about 99 percent by weight of carrier and from 5 percent to about 1 percent by weight of toner. Examples of toners and carriers that can be selected are illustrated in U.S. Pat. Nos. 3,590,000; 4,298,672; 4,264,697; 4,338,390; 4,904,762; 4,883,736; 4,937,166 and 4,935,326, the disclosures of which are totally incorporated herein by reference.

Figure 3:
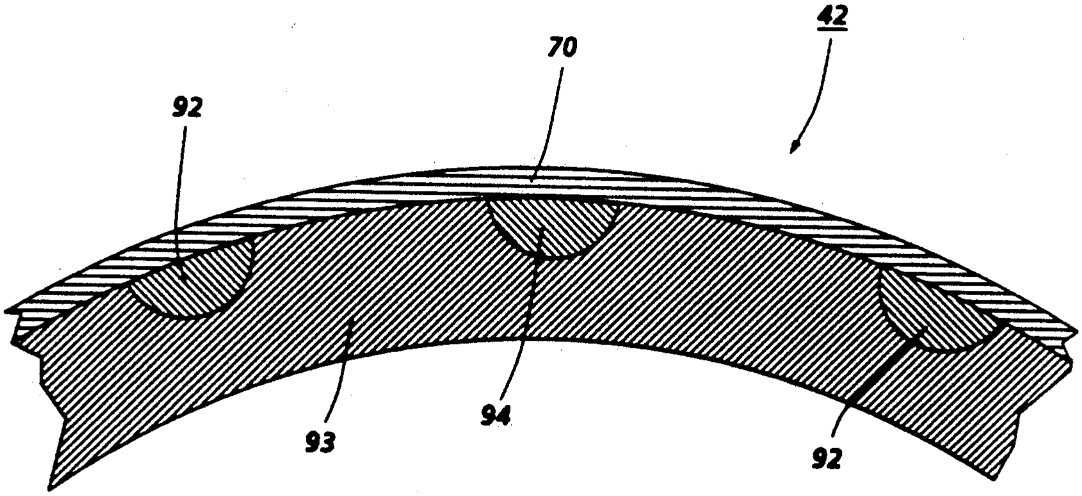
FIG. 3 is a fragmentary, sectional view depicting a portion of the donor roll showing the interdigitated electrodes and overcoating.

Referring to FIG. 3, there is shown a fragmentary sectional elevational view of donor roll 42. As illustrated, donor roll 42 includes a dielectric sleeve 93 having substantially equally spaced electrodes on the exterior circumferential surface thereof. The electrodes extend in a direction substantially parallel to the longitudinal axis of the donor roll 42. The electrodes are typically 100 μm wide and spaced approximately 150 μm. A charge relaxable overcoating 70 is continuously coated on the entire circumferential surface of donor roll 42. Preferably, the charge relaxation layer has a thickness of ~25 μm, and can be applied by a number of known methods such as spray or dip coating.

The following Examples are provided, wherein parts and percentages are by weight unless otherwise indicated.

EXAMPLE I

The donor roller 42 is comprised of electrodes that are overcoated with a thin (25 μm) charge relaxable overcoating to prevent shorting between the electrodes and the conductive magnetic brush in the toner loading zone. Furthermore, the overcoating prevents electrical breakdown and shorting between interdigitated electrodes when an AC bias is applied in the development zone. The resistivity of the overcoating material must be sufficiently large so that the AC fringe electric field is not appreciably attenuated by the overcoating.

Specific materials for relaxable overcoatings satisfy a number of requirements including a high dielectric breakdown strength (up to 1,500 volts across a 25 μm thick coating), low residual potential (less than 5 volts across a 25 μm thick coating), cycling stability and wear resistance.

A film was prepared by the partial oxidation of the charge transporting molecule, N,N'-diphenyl-N,N'-bis(3-methylphenyl)-(1,1'-biphenyl)-4,4'-diamine, dispersed in polycarbonate employing the oxidizing agent trifluoroacetic acid (TFA).

In the presence of the oxidizing agent, the partially oxidized charge transporting molecule, N,N'-diphenyl-N,N'-bis(3-methylphenyi)-(1,1'-biphenyl)-4,4'-diamine, acts as carrier sites that are transported through the unoxidized charge transporting molecules. For example, a typical film is coated from a methylene chloride (12 grams) solution of 1.5 grams of MAKROLON TM, a bisphenol A polycarbonate and 0.329 gram of the molecule, N,N'-diphenyl-N,N'-bis(3-methylphenyl)-(1,1'-biphenyl)-4,4'-diamine and 0.45 gram of the oxidizing agent trifluoroacetic acid (TFA). The mixture was agitated to affect a complete solution. A layer of the resulting solution was coated on titanized MELINEX TM substrate, about 100 microns in thickness, using a Bird film applicator. The film was dried in a forced air oven at 80° C. for 30 minutes. The carrier concentration and hence the conductivity can be varied by changing the concentration of the oxidant. An alternative method for varying the conductivity or relaxation time constant is to modify the average velocity of the hole transport carrier by changing the concentration of the charge-transporting molecule in the film composition.

Table 1 compares measurements of the charge relaxation time constant and residual surface potential of coatings (~25 μm) which differ in the oxidant and the amount of (MD) N,N'-diphenyl-N,N'-bis(3-methylphenyl)-(1,1'-biphenyl)-4,4'-diamine, bisphenol A polycarbonate selected. The time constant is measured by applying a pulsed voltage to a sample sandwiched between electrodes. The residual surface potential was measured in a drum scanner operated at a surface speed of 25 centimeters/second in a constant current mode. After corona charging, the residual potential was measured after 0.13 second which corresponds to 2 cycles.

TABLE 1

| MD (g) | Makrolon (g) | TFA (g) | Relaxation Time | Residual, 2 cycle (V) |
|---|---|---|---|---|
| 1.000 | 1.5 | 2.00 | 9.9 μs | 2 |
| 1.000 | 1.5 | 1.00 | 16.5 μs | 3 |
| 1.000 | 1.5 | 0.20 | 169 μs | 50 |
| 1.000 | 1.5 | 0.10 | 373 μs | 400 |
| 1.000 | 1.5 | 0.02 | 1.9 ms | 1,000 |
| 1.000 | 1.5 | 0.01 | 3.0 ms | 1,500 |
| 0.807 | 1.5 | 0.40 | 181 μs | 100 |
| 0.645 | 1.5 | 0.40 | 350 μs | 30 |
| 0.500 | 1.5 | 0.40 | 580 μs | 50 |
| 0.375 | 1.5 | 0.40 | 1.73 ms | 50 |
| 0.329 | 1.5 | 0.45 | 3.36 ms | 10 |
| 0.286 | 1.5 | 0.45 | 11.7 ms | 10 |

From the data displayed in Table 1, It is shown that a wide range in the charge relaxation time constant can be achieved by varying both the oxidant and the ratios among the charge transporting monomer, and as a binder for the charge transporting monomer bisphenol A polycarbonate. The ability to "dial" the charge relaxation time enables one to select a material composition that provides the optimum charge relaxation time considering the process conditions of the AC frequency and donor roll speed. Furthermore, the residual potentials are considered to be low for some of the materials.

EXAMPLE II

A film was prepared by the process of Example I, and more specifically, by the partial oxidation of the molecule N,N'-diphenyl-N,N'-bis(3-methylphenyl)-(1,1'-biphenyl)-4,4'-diamine dispersed in MAKROLON TM, employing the oxidizing agent $FeCl_3.6H_2O$. A typical film was coated from a methylene chloride (12 grams) solution of 1 gram of MAKROLON TM and 0.15 gram of the molecule N,N'-diphenyl-N,N'-bis(3-methylphenyl)-(1,1'-biphenyl)-4,4'-diamine and 0.06 gram of the oxidizing agent $FeCl_3.6H_2O$ and the mixture was agitated to affect a complete solution. The film was dried in a forced air oven at 80° C. for 30 minutes. Measurements of the charge relaxation time constant of a coating (~20 μm) resulted in a time constant of 2.8 milliseconds. The time constant was measured by applying a pulsed voltage to a sample sandwiched between electrodes. To measure the residual surface potential, a drum scanner was operated at a surface speed of 25 centimeters/second in a constant current mode. After corona charging, the residual potential was measured after 0.13 second, which corresponds to two cycles. After the 2 cycles, the residual was 9 volts.

The measurement results are shown in Table 2.

TABLE 2

| MD (g) | Makrolon (g) | $FeCl_3$ (g) | Film Thickness (μm) | Relaxation Time | Residual, 2 cycle (V) |
|---|---|---|---|---|---|
| 1.00 | 1 | 0.005 | 20 | 338 μs | 20 |
| 1.00 | 1 | 0.010 | 25 | 259 μs | 10 |
| 1.00 | 1 | 0.030 | 20 | 96 μs | 6 |
| 1.00 | 1 | 0.050 | 25 | 46 μs | 6 |
| 1.00 | 1 | 0.080 | 30 | 20 μs | 5 |
| 1.00 | 1 | 0.090 | 25 | 17 μs | 5 |
| 0.15 | 1 | 0.050 | 20 | 3.4 ms | 7 |
| 0.15 | 1 | 0.060 | 20 | 2.8 ms | 9 |

A wide range in the charge relaxation time constant can be achieved by varying both the oxidant and the ratios among N,N'-diphenyl-N,N'-bis(3-methylphenyl)-(1,1'-biphenyl)-4,4'-diamine, and bisphenol A polycarbonate. Furthermore, the residual potentials were quite low.

The wear resistance of the coatings of the diamine molecule in polycarbonate is excellent in that, for example, no degradation is observed after 10,000 imaging cycles. The conductive magnetic brush used to load the toner can be one of the primary causes of any overcoating wear.

The overcoating materials illustrated herein may be used on other substrates, such as belts and sheets, and for other applications like bias toner transfer rolls and intermediate transfer belts in situations where there is a need for an overcoating with a charge relaxation time constant in the range of a few microseconds to seconds. The overcoatings can be applied by any suitable means including spray, dip, web, flow extrusion, and the like. Other hole transporting polymers and oxidants can also be employed.

Other embodiments and modifications of the present invention may occur to those skilled in the art subsequent to a review of the information presented herein; these embodiments and modifications, as well as equivalents thereof, are also included within the scope of this invention.

What is claimed is:

1. A coated toner transport roll consisting essentially of a core with a coating thereover of charge transporting monomers dispersed in a binder and an oxidizing agent selected from the group consisting of ferric chloride and trifluoroacetic acid, which oxidizing agent is present in an amount of from about 1 to about 50 weight percent, and wherein said coating possesses a relaxation time of from about 0.0099 millisecond to about 3.5 milliseconds, and a residual voltage of from about 1 to about 10 volts.

2. A coated toner transport roll in accordance with claim 1 wherein the charge transporting monomer is a diamine of the formula

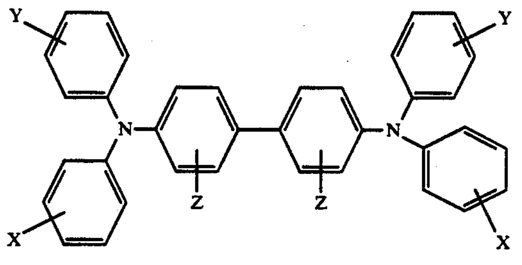

wherein X, Y and Z are selected from the group consisting of hydrogen, an alkyl group with from 1 to 25 carbon atoms and a halogen, and at least one of X, Y and Z is independently an alkyl group or halogen; and the binder is a polymeric component.

3. A coated toner transport roll in accordance with claim 1 wherein the coating is of a thickness of from about 3 to about 50 microns.

4. A coated toner transport roll in accordance with claim 1 wherein the charge transporting monomer is an aryldiamine molecule dispersed in a polyethercarbonate binder.

5. A coated toner transport roll in accordance with claim 4 wherein said aryl diamine molecule is comprised of aryldiamine components of the following general formula wherein X, Y and Z are selected from the group consisting of hydrogen, an alkyl group with from 1 to 25 carbon atoms, and chlorine, and at least one of X, Y and Z is independently an alkyl group or chlorine,

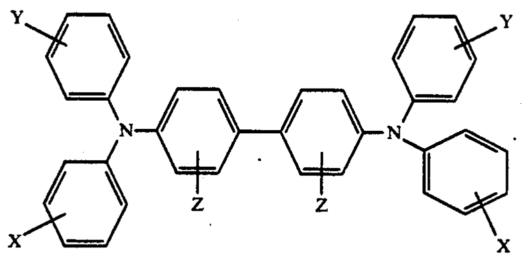

6. A transport roll in accordance with claim 2 wherein the diamine is N,N'-diphenyl-N,N'-bis(3-methylphenyl)-(1,1'-biphenyl)-4,4'-diamine, the resin binder is bisphenol A polycarbonate, the relaxation time is about 2.8 milliseconds, and the residual is 9 volts.

7. A transport roll in accordance with claim 1 with a volume electrical resistivity of about $10^9$ ohm-cm to $10^{11}$ ohm-cm, and a dielectric constant of from about 3 to about 5.

8. A transport roll in accordance with claim 1 wherein the oxidizing agent is present in an amount of from about 2 weight percent to about 15 weight percent.

9. A transport roll in accordance with claim 1 wherein the core is comprised of electrodes.

* * * * *